United States Patent

George

[15] 3,706,332
[45] Dec. 19, 1972

[54] CIRCULAR SAW GUARD AND LINKAGE

[72] Inventor: William Alan George, Cockeysville, Md.

[73] Assignee: The Black and Decker Manufacturing Company, Towson, Md.

[22] Filed: Jan. 13, 1971

[21] Appl. No.: 106,125

[52] U.S. Cl. ................................................143/159
[51] Int. Cl. ..............................................B27g 19/04
[58] Field of Search............143/159, 159 H; 144/251

[56] References Cited

UNITED STATES PATENTS

| 2,737,985 | 3/1956 | Utz | 143/159 H |
| 2,963,056 | 12/1960 | Rickford | 143/159 H |

FOREIGN PATENTS OR APPLICATIONS

| 1,052,104 | 3/1959 | Germany | 143/159 H |
| 1,056,355 | 4/1959 | Germany | 143/159 H |

*Primary Examiner*—Donald R. Schran
*Attorney*—Leonard Bloom, Joseph R. Slotnik and Edward D. Murphy

[57] ABSTRACT

A portable electric circular saw comprising a housing having a motor supported thereon. A shaft driven by the motor has a circular saw blade fixed thereto. A shoe plate is fixed to the housing and is adapted to support the saw for movement along a workpiece. An upper guard is fixed to the housing and encompasses the cutting edge along substantially the upper half of the circular saw blade. A lower guard is pivotally supported upon the housing and normally encompasses the cutting edge along substantially the lower half of the circular saw blade. Novel means is provided whereby the lower guard is moved from its normal position, in response to positioning of the saw pursuant to cutting a workpiece, to expose that portion of the circular saw blade edge necessary to cut the workpiece.

4 Claims, 5 Drawing Figures

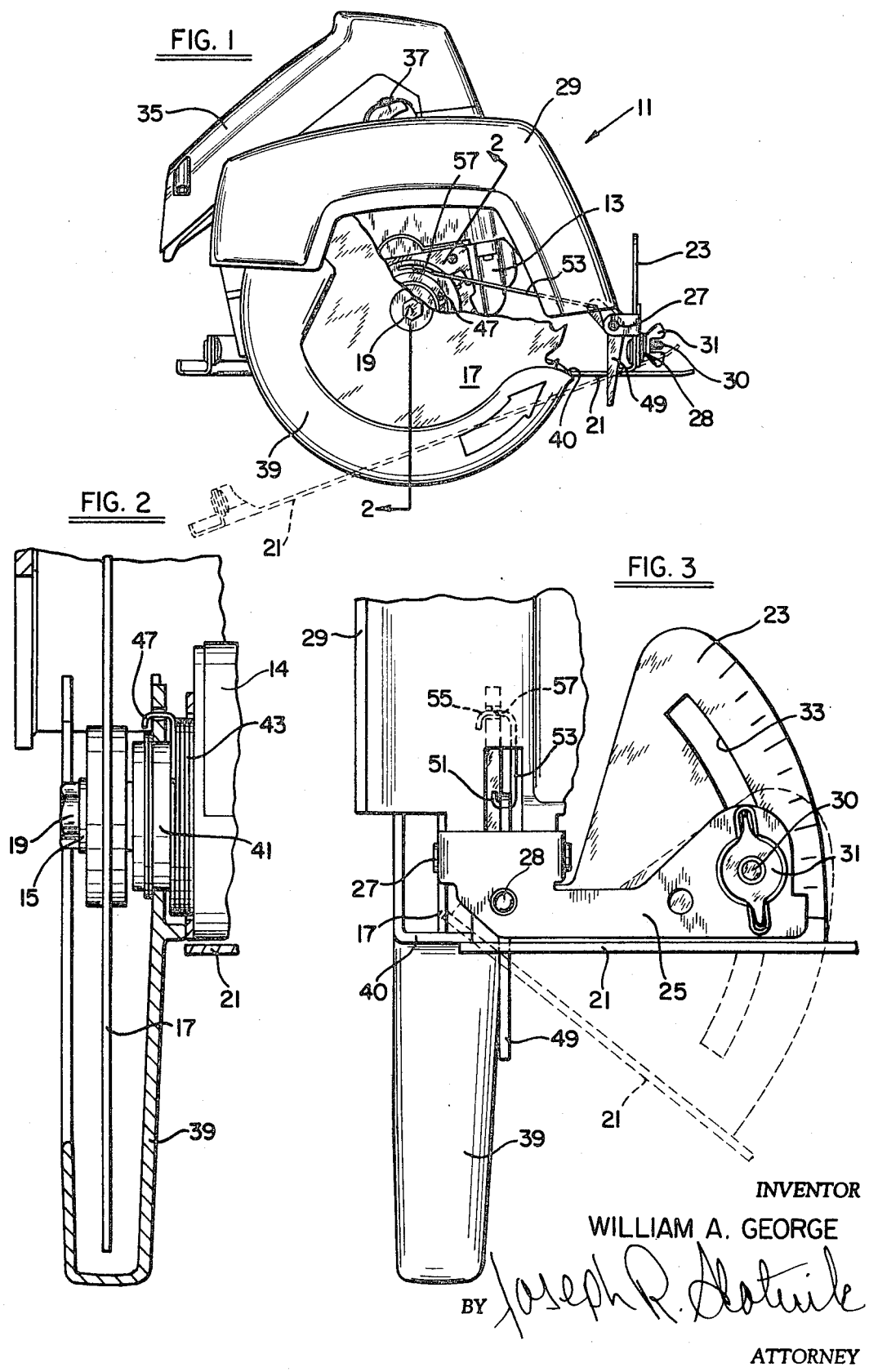

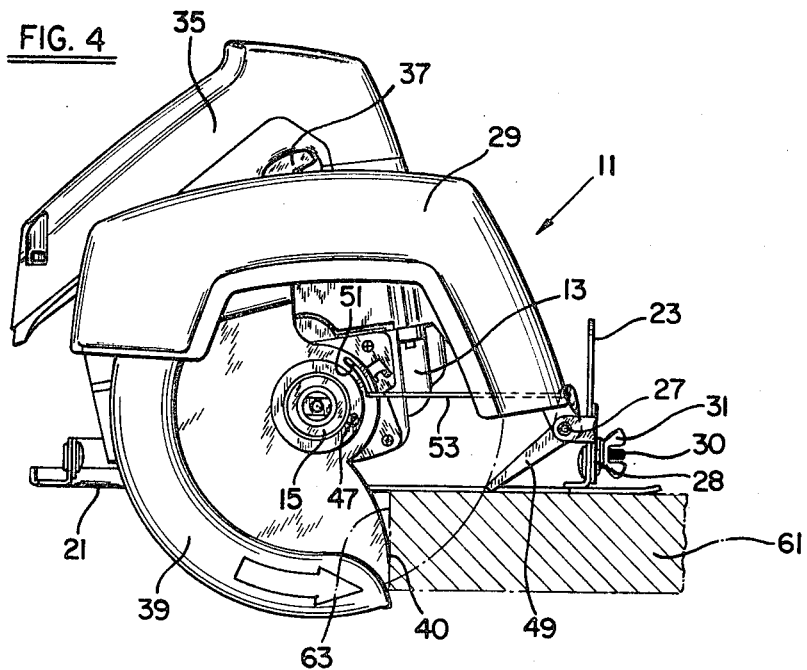
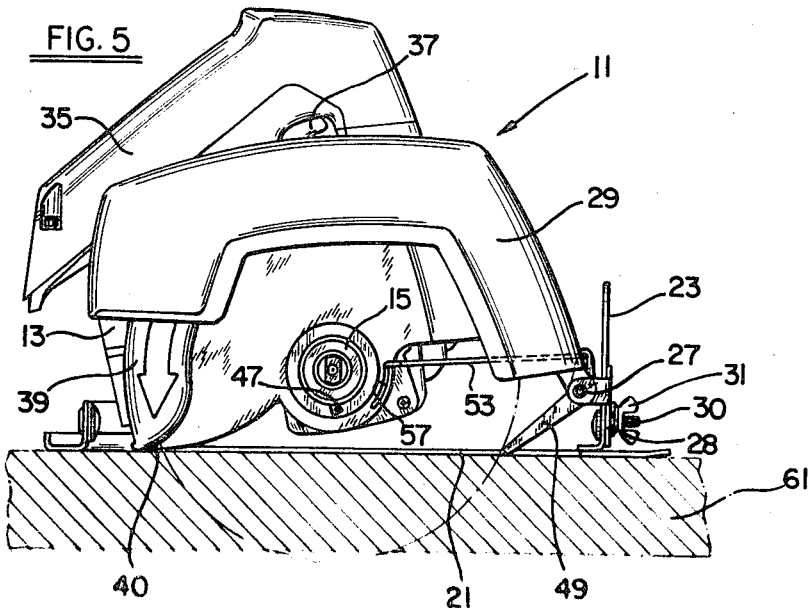

CIRCULAR SAW GUARD AND LINKAGE

SUMMARY OF THE INVENTION

The present invention is directed to a circular saw having a saw blade guard assembly, comprising a stationary and a movable guard, wherein the movable guard is normally disposed to cooperate with the stationary guard and encompass the cutting edge along substantially the entire periphery of the circular saw blade for protection of the operator, but wherein novel means is provided to automatically move the lower guard and expose the circular blade for normal cutting of a workpiece in response to positioning the saw adjacent to the workpiece to be cut. With this construction, the saw embodies the ultimate in safety and yet is readily usable to perform normal cutting. In addition, the present invention contemplates a minimum of part change and variation to conventional circular saws and is constructed to be efficiently and effectively operable in all normal operating positions of conventional circular saws.

Main objects of the present invention, therefore, are to provide a novel circular saw blade guard construction which encompasses substantially the entire peripheral edge of a circular saw blade when the saw is not being utilized to cut a workpiece, but which guard assembly is readily operable to expose that portion of the saw blade necessary to perform cutting action on a workpiece when the saw is positioned adjacent to and moved into cutting relation with the workpiece.

Further important objects of the present invention are to provide a novel circular saw blade guard assembly of the above character which is adapted for use with a variety of standard circular saws with a minimum of part change and/or variation, and which is operable in an efficient and effective manner in virtually all normal operating positions of conventional circular saws.

Additional important objects of the present invention are to provide a construction of the above character which is relatively inexpensive to manufacture, durable in construction, and reliable in use.

Other objects and advantages of the present invention will become more apparent from a consideration of the detailed description to follow taken in conjunction with the drawings annexed hereto.

BRIEF DESCRIPTION OF THE DRAWINGS

FIG. 1 is a side elevational view, with parts broken away for clarity, illustrating a circular saw embodying the present invention and showing the parts in their normal position;

FIG. 2 is an enlarged sectional view of FIG. 1 taken along the line 2—2 thereof;

FIG. 3 is an enlarged front elevational view of a portion of FIG. 1;

FIG. 4 is a view similar to FIG. 1 but showing the position of the parts during the initial phase of cutting a workpiece; and FIG. 5 is a view similar to FIGS. 1 and 4 showing the position of the parts with full lower guard retraction during workpiece cutting.

BROAD STATEMENT OF THE INVENTION

Broadly described, the present invention relates to a portable circular saw including a housing, a motor supported upon said housing and adapted to transmit rotation to a shaft, a circular saw blade fixed to said shaft for rotation therewith, a shoe plate carried by said housing and adjustable relative thereto about first and second axes substantially normal to one another, an upper guard normally fixed to said housing and encompassing the cutting edge along substantially the upper half of said blade, a lower guard movably supported upon said housing and positionable to encompass the cutting edge along substantially the lower half of said blade, means normally biasing said lower guard to said blade encompassing position, actuating means independent of said lower guard and engageable with said workpiece for all adjusted positions of said shoe plate when said saw is moved into position to cut said workpiece, linkage means interconnecting said actuating means and said lower guard and operable to move said lower guard away from said blade encompassing position when said actuating means engages said workpiece.

In another aspect, the present invention relates to a circular saw assembly comprising a housing, a motor supported upon said housing, a shaft rotated by said motor and supported upon said housing for rotation about an axis, a normally stationary guard encompassing a portion of the periphery of said blade located to one side of said axis, a movable guard pivotally supported upon said housing for movement from a first position where it encompasses substantially all the periphery of said blade on the other side of said axis, to a second position exposing said last mentioned portion of said blade, means normally biasing said movable guard toward the first position, a shoe plate carried by said housing and adapted to rest upon the surface of a workpiece to be cut by said saw blade, said shoe plate having a work surface engaging portion located to the other side of said axis, an actuating lever pivoted on said housing and extending into position to engage a workpiece upon which said shoe plate is resting and about to be cut by said blade, a link pivoted at one end to said lever and pivoted at its other end with respect to said movable guard, whereby to initially retract said movable guard away from said first position and thereby expose a relatively small portion of the periphery of said blade to said workpiece when said lever engages and is pivoted by engagement with said workpiece, said movable guard thereafter being directly engageable with said workpiece as said saw progresses through said workpiece, whereby to further move said movable guard away from said first position, and lost motion means between said link and said movable guard allowing said further retraction of said movable guard without corresponding additional movement of said lever or link.

In yet another aspect, the present invention relates to a circular saw assembly comprising a housing, a motor supported upon said housing, a shaft rotated by said motor and supported upon said housing for rotation about an axis, a normally stationary guard encompassing a portion of the periphery of said blade located to one side of said axis, a movable guard pivotally supported upon said housing for movement from a first position where it encompasses substantially all the periphery of said blade on the other side of said axis, to a second position exposing said last mentioned portion of said blade, means normally biasing said movable guard toward said first position, a shoe plate carried by said housing and adjustable relative thereto about first and second axes substantially normal to one another, said shoe plate having a work surface engaging portion located to the other side of said axis, an actuating lever pivoted on said housing and extending into position to engage a workpiece upon which said shoe plate is resting and about to be cut by said blade for all adjusted positions of said shoe plate, means interconnecting said actuating lever with said movable guard whereby to retract said movable guard away from said first position and thereby expose the periphery of said blade to said workpiece when said lever engages and is pivoted by engagement with said workpiece.

DETAILED DESCRIPTION

Referring now more specifically to the drawings, a circular saw embodying the present invention is illustrated generally at 11 in FIG. 1 and is seen to include a housing 13 having an electric motor 14 supported thereon. A handle 35 fixed to the housing 13 has a trigger switch 37 mounted thereon for on-off control of the saw 11.

The motor 14 has an output rotary shaft 15 extending to one side of the housing 13 to which a circular saw blade 17 is affixed by a bolt 19. A saw supporting shoe plate assembly includes a shoe plate 21 rigid with an upstanding sector 23. A bracket 25 is pivoted by a pin 27 to a normally stationary guard 29 fixed to the housing 13, and is pivoted by a pin 28 to the section 23. A bolt 30 is carried by the bracket 25 and extends through an arcuate slot 33 formed in the sector 23 and has a wing nut 31 threaded thereon. Thus, the shoe plate 21, which is adapted to support the saw 11 upon a workpiece surface, is adjustable about the axis of the pin 27 to vary the depth of cut performed by the saw blade 17, and is further adjustable about the axis of the pin 28 to vary the angle (bevel) of cut of the saw blade 17.

As seen in the drawings, the normally stationary guard 29 encompasses substantially that part of the peripheral cutting edge of the blade 17 located above the blade axis (shaft 15). In addition, a lower guard 39 is pivotally supported upon a hub 41 coaxial with the shaft 15. This lower guard 39 is pivotally movable from a first position, shown in FIG. 1, where it encompasses substantially all that part of the peripheral cutting edge of the saw blade 17 left uncovered by the upper guard 29, to a second position shown in FIG. 5, where it telescopes within the upper guard 29 and exposes the peripheral cutting edge of the saw blade 17 below its axis. A torsion spring 43 has one end (not shown) attached to the hub 41 and its other end 47 attached to the lower guard 39 and normally biases the lower guard 39 into the FIG. 1 position.

Conventionally, the lower guard on portable, circular saws is shaped at its forwardmost end to be engageable with the edge of a workpiece to be cut as the saw is moved into position for cutting. Then, as the saw is moved along the workpiece, the lower guard is automatically progressively retracted or telescoped into the upper guard. This is desirable since it allows the operator to keep his hands clear of the blade area during use; however, this arrangement does require that a substantial arcuate segment of the peripheral cutting edge of the blade be exposed even when the lower guard is in its normal, fully guarding position.

Furthermore, when an adjustable depth of cut and angle of cut arrangement is used, such as is provided in the present construction by the adjustable shoe plate 21, conventional saws require even more of the saw blade periphery to be normally exposed since, in order to reduce the depth of cut of the blade 17 from that shown in full lines in FIGS. 1, 4 and 5, the position of the shoe plate 21 is lowered by pivoting about the pin 27 to the position shown in broken lines in FIG. 1. Thus, in order for the lower guard 39 to be retractable by direct engagement with the workpiece, it is necessary that the mouth or leading edge of the lower guard, which engages the leading edge of the workpiece to effect lower guard retraction, be low enough to so engage the workpiece when the shoe plate 21, in its lowest position (for the shallowest cut), is resting on the workpiece surface.

Similarly, when the shoe plate 21 is adjusted about the pin 28 to perform a bevel cut in a workpiece, such as is shown in broken lines in FIG. 3, the workpiece engaging leading edge or mouth of the lower guard must again have a normal position which is low enough to engage the workpiece edge pursuant to performing a cut therein, thereby exposing even more of the cutting edge of the saw blade 17 when the lower guard 39 is in its normal, fully guarding position.

If the lower guard of a conventional saw were constructed to encompass substantially the entire part of the cutting edge of the saw blade left exposed by the upper guard in the previous constructions, this lower guard would not be retractable simply by engagement with the edge of the workpiece, but would require that the operator manually retract the lower guard to at least a partially opened position where the leading edge or mouth of the lower guard could then be engaged by the edge of the workpiece to be cut. This, of course, is unsafe and undesirable since it may require that the operator place his hand near the saw blade.

In accordance with the present invention, the lower guard 39 is normally disposed to encompass substantially all that part of the cutting edge of the saw blade 17 which is left uncovered by the stationary upper guard 29, and all that part of the blade cutting edge which is below the shoe plate 21. In addition, means is provided whereby the lower guard 39 is automatically retracted into telescopic relationship with the stationary upper guard 29 as the saw blade 17 progresses through the workpiece.

As shown in FIG. 1 and FIG. 3, an actuating lever 49 is pivoted upon the pin 27 and extends downwardly below the shoe plate 21 slightly forwardly of the leading edge of the saw blade 17 and at least adjacent the plane thereof. The lever 49 has an upper portion on the other side of the pin 27 to which one end 51 of a connecting link 53 is attached. The other end 55 of the link 53 extends through an arcuate slot 57 formed in the lower guard 39.

In the position of the parts shown in FIG. 1, the end 55 of the link 53 is at one end of the slot 57 and the actuator lever 49 is substantially vertical and extends below the shoe plate 21 in position to engage the leading edge of the workpiece to be cut. When a workpiece 61 is to be cut, the saw 11 is placed so that the shoe plate 21 rests on the surface of the workpiece 61 and the lever 49 is moved against a leading edge 63 of the workpiece and the saw blade 17 advanced toward the workpiece leading edge 63.

When this occurs, the lever 49 is pivoted in a clockwise direction, as seen in FIGS. 1 and 4 from the position shown in FIG. 1 to the position shown in FIG. 4. This acts through the link 53 and causes the lower guard 39 to also pivot in a clockwise direction from the position shown in FIG. 1 to the position shown in FIG. 4. In this position, the leading cutting edge of the saw blade 17 is exposed and moves into cutting relation with the workpiece 61. In addition, the lower guard 39 has been retracted to a position so that its mouth or leading edge 40 can now engage the leading edge 53 of the workpiece 61 so that as the saw 11 is moved along the workpiece 61 and the saw blade 17 continues to perform a cut progressively along the workpiece 61, engagement between the workpiece edge 63 and the edge 40 of the lower saw guard 39 continues to pivot the lower saw guard 39 in a clockwise direction. This action continues until, ultimately, the lower saw guard 39 is fully retracted within the stationary upper guard 29 as shown in FIG. 5. During this continued pivoting action of the lower guard 39 from the FIG. 4 position to the FIG. 5 position, the actuating lever 49 and the link 53 remain stationary, the elongated arcuate slot 57 in the lower guard 39 providing a lost-motion connection and facilitating the continued or further retraction of the lower guard 39.

Upon completion of the cutting action of the saw blade 17 on the workpiece 61, the saw 11 is removed from the workpiece 61 whereupon the torsion spring 43 returns the lower guard 39 to the FIG. 1 position. During this return action of the lower guard 39, the end 55 of the link 53 re-engages the end of the arcuate slot 57 and returns the actuating lever 49 to the FIG. 1 position.

It will be appreciated that since the peripheral cutting edge of the saw blade 17 is normally substantially completely encompassed by the guards 29 and 39, the present construction is effective to protect the operator from accidental injury from contact with the saw blade 17. In other words, the saw guards 29 and 39 substantially completely encompass the peripheral cutting edge of the saw blade 17 except when the saw 11 is cutting a workpiece, and only that part of the peripheral cutting edge as is necessary to perform this cut is exposed when the saw is in position to perform a cut on a workpiece.

In addition, it will be appreciated that this is achieved without hampering the performance or ease of using the saw 11 and that the lower guard 39 is quickly, easily and effectively retracted from its normal guarding position simply by moving the saw 11 into position to cut a workpiece 61. Furthermore, the construction of the present invention facilitates the aforesaid advantages without contributing materially to the overall cost of the saw and that virtually standard parts may otherwise be used in the saw construction. All that need be done is to extend the arcuate length of the lower guard to encompass a greater arcuate extent of the saw blade 17, and add the lever 49 and link 53.

While a preferred embodiment of the present invention has been illustrated and described above in detail, it will be appreciated that various additions, substitutions, modifications and omissions may be made thereto without departing from the spirit of the invention. Thus, for example, the actuator means (lever 49) may be supported upon the normally stationary guard 29 or upon other convenient means depending upon the particular saw construction employed.

I claim:

1. A portable circular saw including a housing, a motor supported upon said housing and adapted to transmit rotation to a shaft, a circular saw blade fixed to said shaft for rotation therewith, a shoe plate carried by said housing and adjustable relative thereto about first and second axes substantially normal to one another, an upper guard normally fixed to said housing and encompassing the cutting edge along substantially the upper half of said blade, a lower guard movably supported upon said housing and positionable to encompass the cutting edge along substantially the lower half of said blade, means normally biasing said lower guard to said blade encompassing position, actuating means independent of said lower guard and engageable with said workpiece for all adjusted positions of said shoe plate when said saw is moved into position to cut said workpiece, linkage means interconnecting said actuating means and said lower guard and operable to move said lower guard away from said blade encompassing position when said actuating means engages said workpiece.

2. A circular saw assembly comprising a housing, a motor supported upon said housing, a shaft rotated by said motor and supported upon said housing for rotation about an axis, a normally stationary guard encompassing a portion of the periphery of said blade located to one side of said axis, a movable guard pivotally supported upon said housing for movement from a first position where it encompasses substantially all the periphery of said blade on the other side of said axis, to a second position exposing said last mentioned portion of said blade, means normally biasing said movable guard toward the first position, a shoe plate carried by said housing and adapted to rest upon the surface of a workpiece to be cut by said saw blade, said shoe plate having a work surface engaging portion located to the other side of said axis, an actuating lever pivoted on said housing and extending into position to engage a workpiece upon which said shoe plate is resting and about to be cut by said blade, a link pivoted at one end to said lever and pivoted at its other end with respect to said movable guard, whereby to initially retract said movable guard away from said first position and thereby expose a relatively small portion of the periphery of said blade to said workpiece when said lever engages and is pivoted by engagement with said workpiece, said movable guard thereafter being directly engageable with said workpiece as said saw progresses through said workpiece, whereby to further move said movable guard away from said first position, and lost motion means between said link and said movable guard allowing said further retraction of said movable without corresponding additional movement of said lever or link.

3. A circular saw assembly comprising a housing, a motor supported upon said housing, a shaft rotated by said motor and supported upon said housing for rotation about an axis, a normally stationary guard encompassing a portion of the periphery of said blade located to one side of said axis, a movable guard pivotally supported on said housing for movement from a first position where it encompasses substantially all the periphery of said blade on the other side of said axis, to a second position exposing said last mentioned portion of said blade, means normally biasing said movable guard toward said first position, a shoe plate carried by said housing and adjustable relative thereto about first and second axes substantially normal to one another, said shoe plate having a work surface engaging portion located to the other side of said axis, an actuating lever pivoted on said housing and extending into position to engage a workpiece upon which said shoe plate is resting and about to be cut by said blade for all adjusted positions of said shoe plate, means interconnecting said actuating lever with said movable guard whereby to retract said movable guard away from said first position and thereby expose the periphery of said blade to said workpiece when said lever engages and is pivoted by engagement with said workpiece.

4. A saw as defined in claim 2 wherein said movable guard includes an elongated slot pivotally and slidably receiving the other end of said link, whereby to form said lost motion means.

* * * * *